United States Patent [19]

Goto et al.

[11] Patent Number: 4,835,560
[45] Date of Patent: May 30, 1989

[54] SELF-TIMING SHUTTER RELEASE CONTROL FOR A CAMERA

[75] Inventors: Shigenori Goto; Fumio Iwai, both Saitama, Japan

[73] Assignee: Fuji Photo Film Co., Ltd., Kanagawa, Japan

[21] Appl. No.: 197,124

[22] Filed: May 19, 1988

[30] Foreign Application Priority Data

May 20, 1987 [JP] Japan ................................ 62-123377

[51] Int. Cl.$^4$ .............................................. G03B 17/40
[52] U.S. Cl. ............................. 354/238.1; 354/173.11; 354/289.12
[58] Field of Search ............ 354/238.1, 239.12, 173.11

[56] References Cited

U.S. PATENT DOCUMENTS 4,699,487 10/1987 Kawamura et al. .......... 354/238.1 X

Primary Examiner—Michael L. Gellner
Attorney, Agent, or Firm—Young & Thompson

[57] ABSTRACT

A self-timing shutter release control device comprises a self-timing shutter release setting device for setting the number of repetitions of self-timing shutter releases, a controller for continuously repeatedly operating a shutter drive system and a power-driven film advancing system in accordance with the number of repetitions of shutter releases set by the setting device, and a display controller for displaying the set number on a display member. The self-timing shutter setting device includes an externally operable member which is operated as many times as the desired number of repetitions of self-timing shutter releases to set the number of repetitions of self-timing shutter releases in the self-timing shutter release setting device.

10 Claims, 4 Drawing Sheets

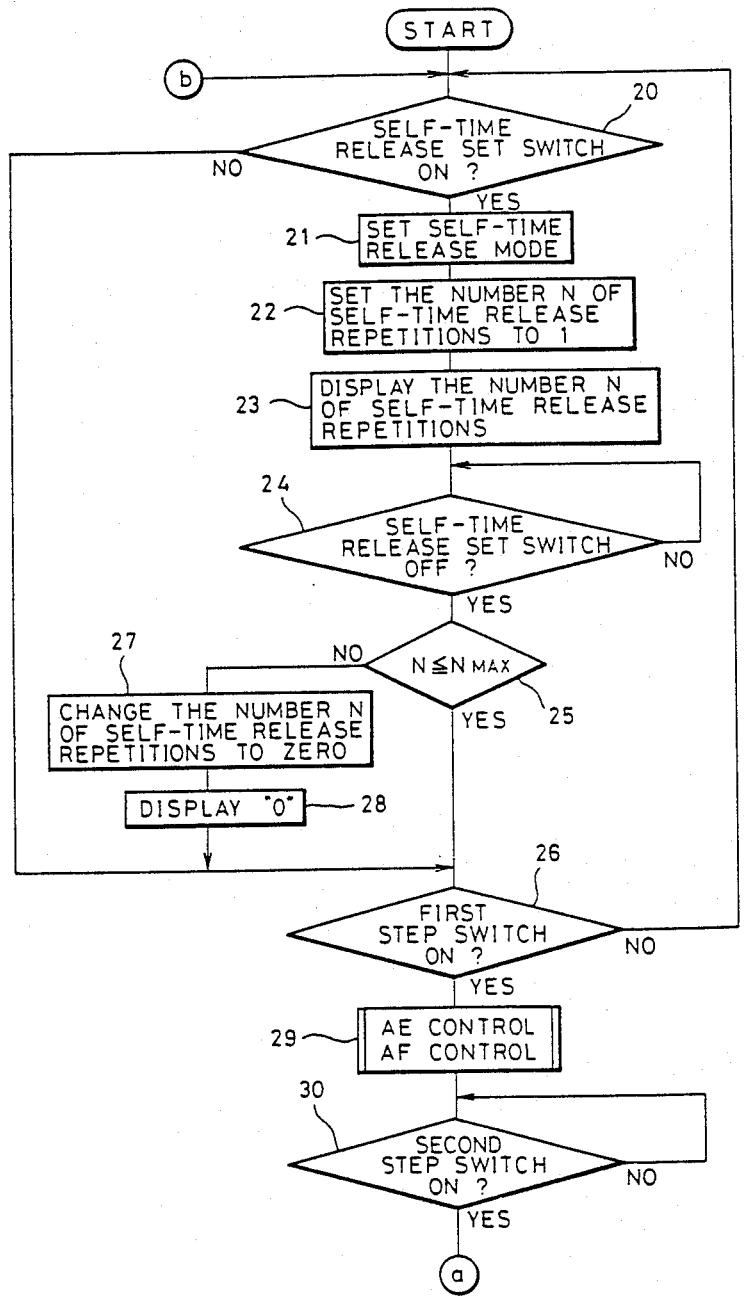

SELF-TIMING SHUTTER RELEASE CONTROL FOR A CAMERA

BACKGROUND OF THE INVENTION

The present invention relates to a self-timing shutter release control device.

As is well-known in the prior art, a self-timing shutter release provides exposure one time for every shutter release. When a number of the same pictures, such as commenorative or group pictures, are needed, a self-timing shutter release is repeatedly operated to provide a number of the same prints, one from each negative frame, in order to save the trouble of making extra prints. In such a case, a self-timing shutter release setting must be effected for every exposure, which is quite troublesome.

OBJECT OF THE INVENTION

It is, therefore, an object of the present invention to provide a self-timing shutter release control device for a camera which allows a number of continuous repetitions of a self-timing shutter release without repeating a self-timing shutter release setting.

SUMMARY OF THE INVENTION

In order to achieve the above and other objects, the present invention provides a self-timing shutter release control device comprising an externally operable member for setting the desired number of repetitions of self-timing shutter release, control means for continuously repeating self-timing shutter release as many times as the number of repetitions set by the externally operable member, and a controller for displaying the number of frames which is changeable in a display mode between two modes; namely, an unexposed frame number display mode and a self-timing shutter release frame number display mode.

According to a preferred embodiment of the present invention, the self-timing shutter release means is continuously repeated as many times as the number of repetitions set by the externally operable member, Therefore, it is unnecessary to reset the self-timing shutter release means for every exposure when a number of repetitions of shutter release is needed to take a number of the same pictures.

DETAILED DESCRIPTION OF THE INVENTION

A self-timing shutter release control device according to a preferred embodiment of the present invention is incorporated in a still picture camera. Because such cameras are well known, this description will be directed in particular to elements forming part of the device embodying the present invention. It is to be understood, however, that camera elements not specifically shown or described may take various forms known to those skilled in the camera art.

Figure 1:
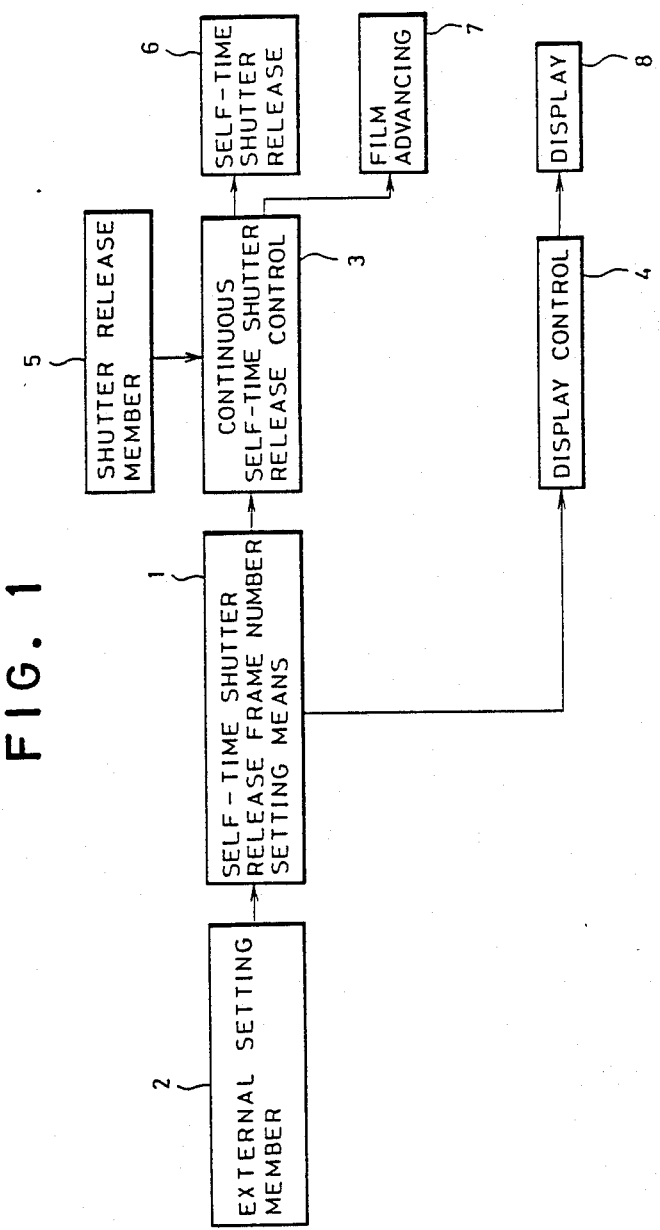
FIG. 1 is a functional diagram showing a self-timing shutter release control device according to the present invention.

Referring now to FIG. 1, which is a functional diagram of a self-timing shutter release control device according to a preferred embodiment of the present invention, the self-timing shutter release control device is incorporated in a camera equipped with at least a self-timing shutter release device 6 in association with a shutter drive system and a power-driven film advancing mechanism 7, both of which are well known in the art, and a display 8 such as an LCD display device as an exposure counter. The self-timing shutter release control device comprises apparatus 1 for setting the number of repetitions of self-timing shutter release according to the number of operations of an externally operable setting member 2, a control device 3, which is actuated by depression of a shutter release member 5 for continuously operating the self-timing shutter release device 6 and the power-driven film advancing mechanism 7 as many times as the number of repetitions of self-timing shutter release set by the externally operable setting apparatus 1, and a display control device 4 for changing the display mode of the display 8 between an ordinary display mode in which the maximum number of film frames available in the camera is displayed and a self-timing shutter release display mode in which the number of repetitions of self-timing shutter release to be effected is displayed.

Figure 2:
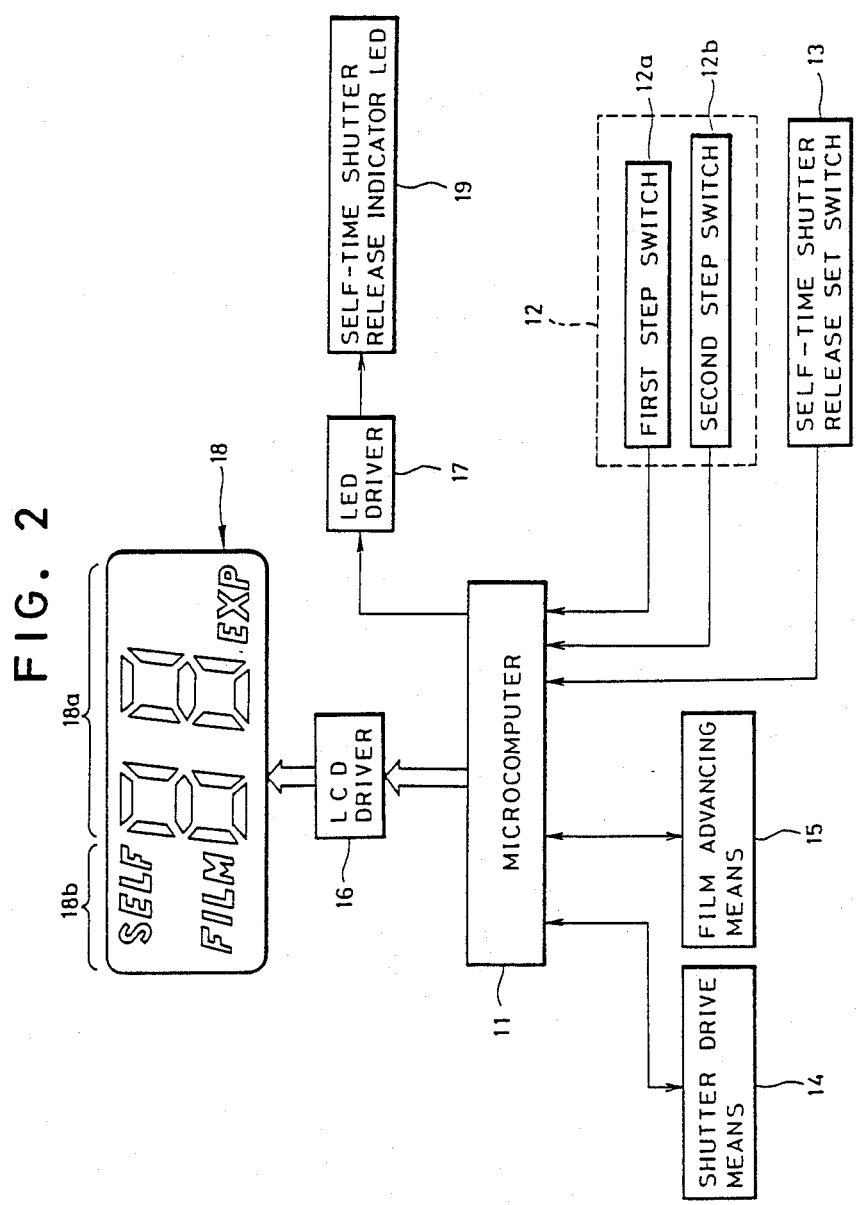
FIG. 2 is a block diagram showing a self-timing shutter release control device of a preferred embodiment according to the present invention.

Referring now to FIG. 2 showing the self-timing shutter release control device of a preferred embodiment according to the present invention, the self-timing shutter release setting control device has a microcomputer 11 which controls the operation of a shutter drive system 14, a film advancing system 15, an LCD driver 16 and an LED driver 17. On the other hand, the microcomputer 11 receives information on the operation of a shutter release switch 12 and a self-timing shutter release setting switch 13. As is well known in the art, the shutter release switch 12 comprises a first step switch 12a for detecting a first step of operation of a shutter release button (not shown) to provide a start signal for starting an automatic exposure (AE) control and an automatic focusing (AF) control through the microcomputer 11 and a second step switch 12b for detecting a second step of operation of the shutter release button to provide a shutter release signal for starting a shutter control through the microcomputer 11. On the other hand, the self-timing shutter release setting switch 13, which is of the pushbutton type, provides information on the number of self-timing shutter releases to be continuously effected.

An LCD display panel 18, which is operated by the LCD driver 16, is provided to display the number of frames on a frame number display section 18a and an operation mode display section 18b. The frame number display section 18a is adapted to display the number of film frames in two modes, namely an ordinary shutter release display mode to display an indication of "FILM" and a number showing the number of unexposed or available frames in the camera, or a self-timing shutter release display mode to display an indication of "SELF" and a number showing the number of repetitions of self-timing shutter releases. An LED 19 is driven by the LED driver to indicate an operation of self-timing shutter release in such a way to light up, blink and then turn off. Operation and construction of the automatic exposure (AE) control and automatic focusing (AF) control is well-known to those skilled in the art and no description thereof is needed.

Figure 3:
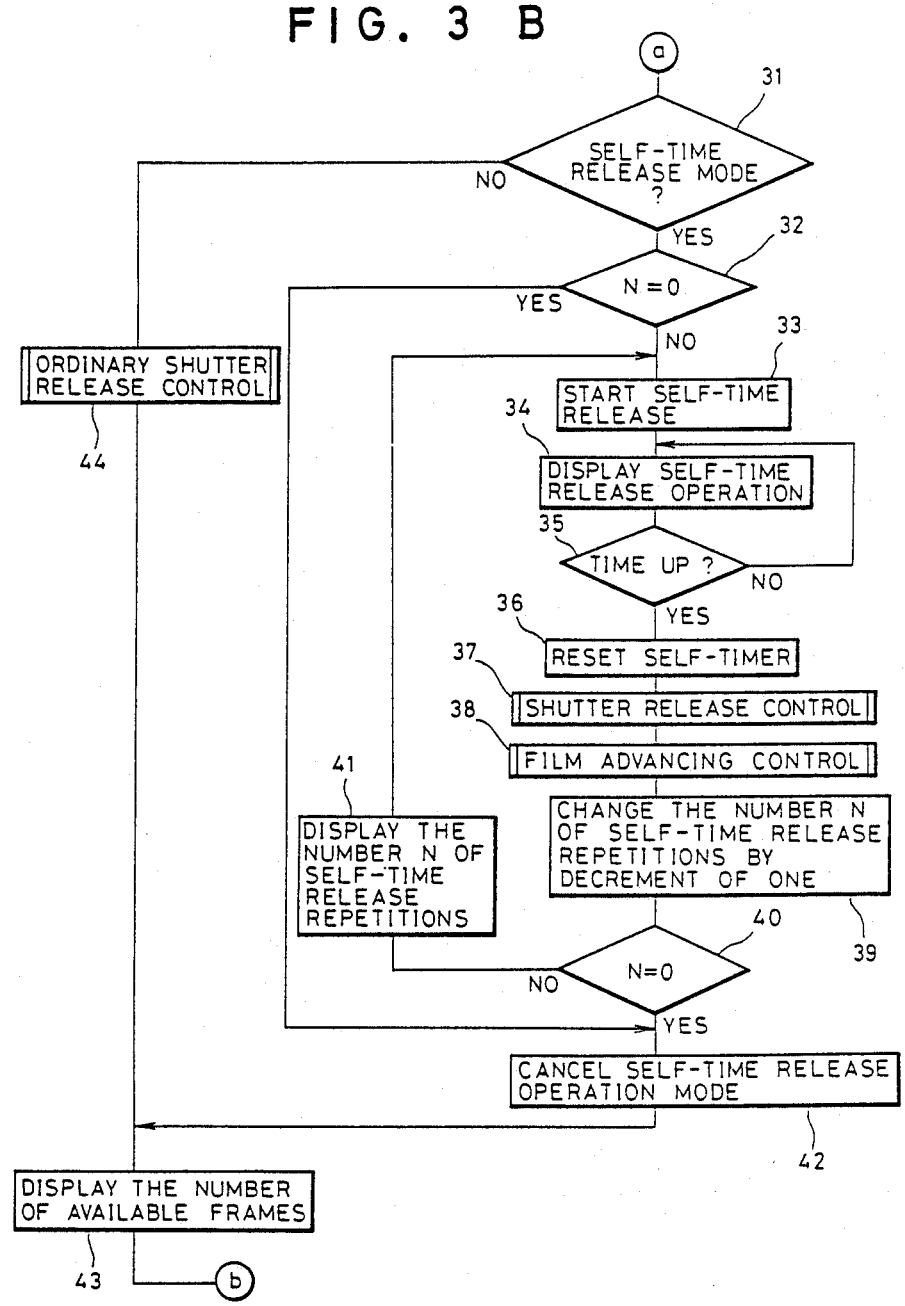
FIGS. 3A and 3B are a flow chart illustrating a general sequence for a microcomputer which controls operation of the self-timing shutter release control device of FIG. 2.

Reference is now made to FIGS. 3A and 3B showing flow charts for explaining the operation of the self-timing shutter release control device of FIG. 2. The first step 20 is to make a decision; "is the self-timing shutter release setting switch 13 pushed on?" If the answer to the first question is yes, the controller 11 selects a self-timing shutter release mode at a step 21 and changes the number N of repetitions of self-timing shutter release by an increment of 1 (one) to set the number of repetitions of self-timing shutter release to "1 (one)" at a step 22. Thereafter, at step 23, the controller 11 changes the display mode of the LCD display panel 18 to the self-timing shutter release display mode from the ordinary shutter release display mode so as to display thereon the indication of "SELF" and a number "1 (one)" in place of the number of unexposed or available film frames. Following the display, a second decision is made at a twenty-fifth step 24: "is the self-timing shutter release setting switch pushed off?" If the answer to the second question is no, indicating the self-timing shutter release setting switch 13 is kept pushed on, the second question is repeated until the self-timing shutter release setting switch 13 is pushed off. If the answer to the second question becomes yes, at the next step 25, a third decision is made: "is the set number N of repetitions of self-timing shutter release equal to or smaller than the number of unexposed film frames?" If the answer to the third question is no, indicating that the number N of repetitions of self-timing shutter releases is not available, the controller 11 resets the number N of repetitions of self-timing shutter releases to zero "0" at a step 27 and, thereafer, displays "0" on the LCD display panel 18 at a step 28.

After the display of "0" or if the answer to the third question is yes, a fourth decision is made: "is the shutter release button pressed in half-way, namely is the first step switch operated?" If the answer to the fourth question is no, indicating that no shutter release operation is required, the sequential operation from the step 20 to the step 26 is repeated until the shutter release button is operated. Repetition of the sequential operation allows renewal of the number N of repetitions of self-timing shutter release operation by an increment of "1 (one)" for every operation of the self-timing shutter release setting switch 13. For example, N-times of operations of the self-timing shutter release setting switch 13 causes the LCD display panel 18 to display a number N as long as N is not larger than $N_{max}$.

If, at the step 26, the shutter release button is pressed down in its half-way position to turn on the first step switch 12a and, therefore, the answer to the fourth question is yes, the AE and AF controls are operated at a step 29. These AE and AF controls may be operated in any well known manner to those skilled in the art. After the completion of AE and AF controls, a fifth decision is made at a step 30: "is the second step switch 12b turned on as a result of a full depression of the shutter release button for effecting an exposure?" When the answer to the fifth question is yes, indicating that the shutter release is actually needed, the controller 11 makes a sixth decision: "is the self-timing shutter release mode set?" If the answer is no, indicating that the self-timing shutter release mode has not been set, the controller 11, at a step 44, controls the shutter drive system 14, the film advancing system 15, and the display panel 18 to operate in the ordinary shutter release operation sequence. Then, the number of unexposed film frames is changed by an decrement of one at a step 43.

On the other hand, if the answer to the sixth question is yes, a seventh decision is made at a step 32: "is the number N of repetitions of self-timing shutter release zero (0)?" If the number N is not zero, the controller 11 actuates the self-timing shutter release to start at a step 33 and actuates the LED driver 17 to operate the LED 19 to flash on and off so as to indicate that a self-timing shutter release is being effected. Following the start of self-timing shutter release, an eighth decision is made at a step 35: "is a predetermined time up?" This eighth question is repeated until the predetermined time is up.

When the predetermined time is up, the answer to the question becomes yes, resetting the self-timer at a step 36. Immediately after the resetting of the self-timer, controller 11 causes the shutter release means 14 and film advancing system 15 to operate in the same sequence as in the ordinary shutter release operation at steps 37 and 38. After the completion of shutter release operation, the controller 11 causes the LCD controller 16 to change the number N of film frames set for self-timing shutter release by a decrement of one (1) at a step 39.

At a step 40, a final decision is made: "is the number N of film frames for self-timing shutter release zero (0)?" If the answer to the final question is no, after displaying a decrement of one for the number N of film frames for self-timing shutter release at a step 41, a sequence between the steps 33 through 40 is continuously repeated until the number N of film frames for self-timing shutter release becomes zero (0).

If the answer to the seventh or the final question is yes, this indicates that no self-timing shutter release is needed any longer. Then, the controller 11 resets the camera to the ordinary shutter release operation mode at a step 42 and resets the LCD display 18 so as to display the number of unexposed film frames at a step 43. The final step orders a return to the initial state.

As is clearly understood from the above description, if, after the number N of repetitions of self-timing shutter release has been set, it is needed to cancel the set number N of repetitions of self-timing shutter release, the self-timing shutter release setting switch 13 is repeatedly pushed until the number N of repetitions of self-timer shutter release is reset to zero (0) at the step 27. Thereafter, the operation of the shutter release button automatically changes the shutter release mode of the camera to the ordinary shutter release mode and makes an exposure.

Although the present invention has been described by way of example thereof with reference to the accompanying drawings, it is to be noted that the possibility of various changes and modifications will be apparent to those skilled in the art. Therefore, unless such changes and modifications depart from the scope of the present invention, they should be construed as included therein.

What is claimed is:

1. A self-timing shutter release control device for use in a camera which has self-timing shutter releasing means, power-driven film advancing means and display means for displaying the number of film frames available in the camera, said control device comprising
setting means including an externally operable member for setting the number of repetitions of self-timing shutter release to be continuously effected;
control means for controlling said self-timing shutter release means and the film advancing means to operate continuously as many times as the number of repetitions of self-timing shutter releases set in said setting means; and display control means for changing the display mode of said display means from an ordinary display mode corresponding to the number of film frames available in the camera to a self-timing display mode corresponding to the number of repetitions of self-timing shutter releases set in said setting means.

2. A control device as defined in claim 1, wherein said externally operable member is an electric switch which is operated as many times as the number of repetitions of self-timing shutter releases to be set in said setting means.

3. A control device as defined in claim 2, wherein said display means is changed in display mode upon the first operation of said externally operable member.

4. A control device as defined in claim 3, wherein said display means changes a displayed number by an increment of one for every operation of said externally operable member.

5. A control device as defined in claim 4, wherein said setting means is reset when said number of repetitions of self-timing shutter releases exceeds the maximum number of film frames available in said camera.

6. A control device as defined in claim 3, wherein said display means changes a displayed number by a decrement of one for every exposure.

7. A control device as defined in claim 3, wherein said display means displays a sign showing said camera in a self-timing shutter release mode of operation.

8. A control device as defined in claim 3, wherein said display means is an LCD display device.

9. A control device as defined in claim 1, and further comprising means for indicating that the camera is being operated in a self-timing shutter release mode.

10. A control device as defined in claim 9, wherein said indicating means is an LED to flash on, blink and then flash off for every self-timing shutter release.

* * * * *